(12) United States Patent
Cardona et al.

(10) Patent No.: US 8,880,757 B1
(45) Date of Patent: Nov. 4, 2014

(54) RDMA RESOURCE LEAKAGE DETECTION AND REPORTING

(71) Applicant: International Business Machines Corporation, Armonk, NY (US)

(72) Inventors: Omar Cardona, Cedar Park, TX (US); Jeffrey P. Messing, Round Rock, TX (US); Carol L. Soto Gonzalez, Pflugerville, TX (US); Pedro V. Torres, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/034,739

(22) Filed: Sep. 24, 2013

(51) Int. Cl.
G06F 13/28 (2006.01)
G06F 3/00 (2006.01)
G06F 5/00 (2006.01)
H04L 12/26 (2006.01)
G06F 15/167 (2006.01)

(52) U.S. Cl.
CPC .......... H04L 43/0823 (2013.01); G06F 15/167 (2013.01)
USPC .............................................. 710/22; 710/40

(58) Field of Classification Search
CPC .......................... G06F 15/167; H04L 43/0823
USPC ..................................................... 710/22, 40
See application file for complete search history.

(56) References Cited

U.S. PATENT DOCUMENTS

| 6,523,141 | B1 | 2/2003 | Cantrill |
| 7,685,254 | B2 | 3/2010 | Pandya |
| 7,721,062 | B1 | 5/2010 | Fair et al. |
| 7,725,559 | B2 | 5/2010 | Landis et al. |
| 2005/0022063 | A1 | 1/2005 | Grebenev |
| 2010/0115273 | A1 | 5/2010 | Chittigala |
| 2011/0239306 | A1 | 9/2011 | Avni et al. |
| 2012/0054877 | A1 | 3/2012 | Rosu |
| 2012/0072779 | A1 | 3/2012 | Takai |
| 2013/0159977 | A1 | 6/2013 | Crosetto et al. |

OTHER PUBLICATIONS

Internet Society, et al., "Direct Data Placement Protocol (DDP)/Remote Direct Memory Access Protocol (RDMAP) Security (RFC5042)", An IP.com Prior Art Database Technical Disclosure; http://ip.com/IPCOM/000159870D, Nov. 1, 2007, 54 pages.
Internet Society, et al., "Internet Small Computer System Interface (iSCSI) Extensions for Remote Direct Memory Access (RDMA) (RFC5046)", An IP.com Prior Art Database Technical Disclosure; http://ip.com/IPCOM/000159874D, Nov. 1, 2007, 87 pages.
U.S. Appl. No. 14/074,262.

*Primary Examiner* — Farley Abad
(74) *Attorney, Agent, or Firm* — Stephen J. Walder, Jr.; Thomas E. Tyson

(57) ABSTRACT

Mechanisms are provided for remote direct memory access (RDMA) resource leak detection. A user space context is generated comprising a user space RDMA resource hierarchical data structure. A kernel context is generated comprising a kernel RDMA resource hierarchical data structure. The kernel RDMA resource hierarchical data structure comprises nodes of the users space RDMA resource hierarchical data structure. A request to close a RDMA resource is received and the user space RDMA resource hierarchical data structure is traversed to determine whether the RDMA resource has child RDMA resources allocated in the user space RDMA resource hierarchical data structure. A resource leak is detected in response to determining, based on at least one of the user space RDMA resource hierarchical data structure or the kernel RDMA resource hierarchical data structure, that the RDMA resource has a child RDMA resource allocated in the user space RDMA resource hierarchical data structure.

10 Claims, 6 Drawing Sheets

RDMA RESOURCE LEAKAGE DETECTION AND REPORTING

BACKGROUND

The present application relates generally to an improved data processing apparatus and method and more specifically to mechanisms for detecting and reporting remote direct memory access (RDMA) resource leakage.

Remote Direct Memory Access (RDMA) is a functionality that allows direct memory access from the memory of one computer into that of another computer without involving either computer's operating system. RDMA facilitates high throughput, low-latency networking, which is especially useful in massively parallel computer clusters.

RDMA supports zero-copy networking by enabling the network adapter of a computer to transfer data directly to or from application memory, thereby eliminating the need to copy data between the application memory and the data buffers in the operating system. Such direct transfers of data do not require any work to be done by the processors, cache memories, or the like, and do not require context switches. Such direct transfers may be performed in parallel with other system operations that the computers are performing. For example, when an application performs a RDMA Read or Write request, the application data is delivered directly to the network via a RDMA enabled network adapter, reducing the latency of the transfer.

Many modern architectures and specifications are designed with RDMA and RDMA enabled network adapters in mind. For example, the InfiniBand™ specification maintained and furthered by the InfiniBand™ Trade Association (IBTA), and InfiniBand™ architectures developed by International Business Machines Corporation of Armonk, N.Y., provide support for RDMA operations to be performed via the InfiniBand™ fabric. Similarly, the Open Fabrics Enterprise Distribution (OFED™) specification and architecture, maintained and furthered by the Open Fabrics Alliance (OFA), and which is built upon the InfiniBand™ specification, also provides support for RDMA operations. For more information about InfiniBand™ and OFED™, additional information may be obtained from the IBTA and OFA organizations and corresponding websites.

SUMMARY

In one illustrative embodiment, a method, in a data processing system comprising a processor and a memory, for remote direct memory access (RDMA) resource leak detection is provided. The method comprises generating, by the data processing system, in a user space of the data processing system, a user space context comprising a user space RDMA resource hierarchical data structure. The method further comprises generating, by the data processing system, in a kernel space of the data processing system, a kernel context comprising a kernel RDMA resource hierarchical data structure. The kernel RDMA resource hierarchical data structure comprises nodes of the users space RDMA resource hierarchical data structure. The method also comprises receiving, by the data processing system, a request to close a RDMA resource and traversing, by the data processing system, the user space RDMA resource hierarchical data structure to determine whether the RDMA resource has child RDMA resources allocated in the user space RDMA resource hierarchical data structure. Moreover, the method comprises detecting, by the data processing system, a resource leak in response to determining, based on at least one of the user space RDMA resource hierarchical data structure or the kernel RDMA resource hierarchical data structure, that the RDMA resource has a child RDMA resource allocated in the user space RDMA resource hierarchical data structure. In addition, the method comprises reporting, by the data processing system, the resource leak.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for Remote Direct Memory Access (RDMA) resource leak detection and reporting. One of the main differences between RDMA and traditional multiplexed input/output (IO) models, such as Network Interface Card (NIC) and Fibre Channel (FC), is resource management. Under multiplexed IO models, a finite set of buffers/resources are allocated by a low level, e.g., Open Systems Interconnection (OSI) model layer 2 (data link layer), device driver. Data that is to be sent/ received is multiplexed through the OSI layer 2 interface via memory copies. The Upper Layer Protocol (ULP) scope of operation of the OSI model is to allocate virtual memory, with the device driver scope of operation being to copy or map the virtual memory for the device driver's use. Data that is received at the data link layer must be copied from the buffers/resources of the data link layer to the virtual memory of the application layer (e.g., layer 7 in the OSI model).

Figure 1:
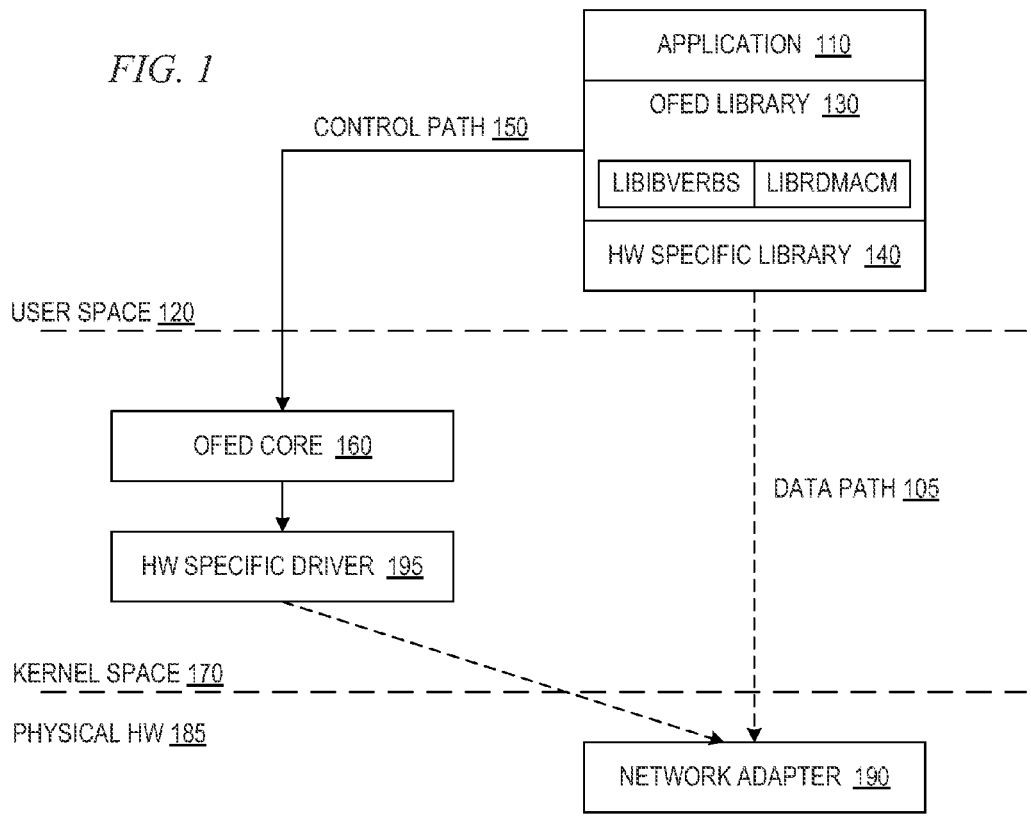
FIG. 1 is an example of one such RDMA model that utilizes an Open Fabrics Enterprise Distribution (OFED™) core.

In order to avoid such copy operations which may require additional resources and may introduce additional latency due to, among other things, the need to perform copy operations between the lower level buffers and the upper level virtual memory, RDMA models have been introduced. FIG. 1 is an example of one such RDMA model that utilizes an Open Fabrics Enterprise Distribution (OFED™) core. As shown in FIG. 1, an application 110 is present in the user space 120 and makes calls to, or otherwise invokes, library functions for performing RDMA operations via an OFED™ library 130 and hardware specific library 140. The OFED™ library 130 comprises verbs library (libibverbs) and DMA connection manager library (librdmacm) which may be used via a control path 150 to communicate with an OFED™ core 160 in the kernel space 170 of the operating system. The verbs in the library 130 are a part of the OFED™ package and provide the applications linking to the library 130, e.g., application 110, with the verb Application Program Interface (API) that the application can use to make use of RDMA functions. Both sub-libraries libibverbs and librdmacm contain verbs with the libibverbs being resource related while the librdmacm verbs are used to handle the protocol to connect queue pairs (QPs) between the local and remote systems. In essence, the OFED™ library 130 contains the application level support for the defacto standard of OFED™ and provides the APIs for implementation of RDMA.

The OFED™ core 160 provides the remaining portions of the OFED™ RDMA mechanisms including the operating system kernel level verb APIs as well as the bulk of the hardware agnostic implementation of the RDMA protocol. The OFED™ core 160 may communicate with the network adapter 180 at the physical hardware level 185 via a hardware specific device driver 195. The hardware specific device driver 195 and the hardware specific library 140 may be specific to the type of network adapter 190 being used in the particular implementation.

As can be seen from FIG. 1, the data path 105 flows directly from the application 110 in the user space 120 to the network adapter 180 in the physical hardware level 185, and vice versa, via RDMA operations performed using the OFED™ library 130 and hardware specific library 140. Control path communications with the network adapter 190 are still routed via the control path 150 to the OFED™ core 160 and hardware specific device driver 195 in the kernel space 170.

Using this architecture, the upper layer protocol (ULP) performs resource creation on the network adapter 190. It should be appreciated that ULP refers to either application or other code that is relatively higher up on the protocol stack in a protocol model, e.g., the OSI model. For example, code that is directly using the OFED™ verbs may be an application at an application layer, but could also be user Direct Access Programming Library (uDAPL), i.e. an application space user, that could be used in turn by a middleware layer that is itself used by the application, e.g., DB2 for example. The term ULP refers to the direct user of the code in this scenario (i.e. the direct user of the OFED™ verbs), without narrowing the ULP to an application which may be many levels removed.

The ULP performs explicit calls to allocate and map resources for Direct Memory Access (DMA) on the device, e.g., the network adapter 180. Thus, the RDMA device driver, i.e. a device driver instance for the particular device, e.g., network adapter 180, which is registered by the hardware specific driver 195 with the OFED™ core 160, one instance per device, e.g., network adapter, is effectively a resource allocator and is more analogous to a Virtual Machine Manager (VMM) than a traditional NIC/FC driver, with the distinction being that the device drivers are dynamic whereas VMM persists for the lifetime of an associated virtual machine (VM). The device driver instances are accessed, by the ULPs, through the verbs of the OFED™ library 130 and/or OFED™ core 160 to allocate resources on specific device/device driver pairs, e.g., network adapter/adapter driver pairs.

A device driver 195 instance must allow for clean upload/reload by each operating system instance (or VM) such that there are no resource leaks. If resource leaks persist, over time the resource leak may prevent the device, e.g., network adapter 190, or even the operating system instance itself, from being able to be used without rebooting the computing device. For example, a failure to free or de-allocate an RDMA resource by the ULP results in memory leaks for combined operating system (or VM) memory, bus memory, adapter hardware memory, etc., all of which are components backing an RDMA resource allocation.

A resource leak, such as a memory leak, occurs when resources are not recovered by management mechanisms for reuse and may remain allocated but are not used or accessed. A resource leak condition may cause error propagation issues including blocking error recovery because recovery cannot proceed due to un-freed resources and associated function pointers causing crashes and data corruption and blocking any reset of firmware update operations for similar reasons. In the case of memory leaks, with RDMA architectures such as shown in FIG. 1, bus memory may leak independent of virtual memory and physical memory on the network adapter 190 may leak independent of the bus memory and/or virtual memory. Thus, the resource leak problems associated with RDMA architectures may be complex and problematic to resolve.

Possible solutions to address the resource leak issues in RDMA architectures fall into the cascading error/error propagation domain, meaning that these solutions abstract a ULP error by encompassing the ULP error within the lower level device driver. For example, a ULP error may be that a ULP kernel extension allocates a queue pair from a device driver configured for RDMA access (i.e. a RDMA device driver) to a corresponding device. However, if the ULP kernel extension then later closes the connection for which the queue pair was allocated and does not free the queue pair resources, from that point forward, the queue pair is not addressed. In such a situation, the RDMA device driver cannot be closed/unloaded from the host system memory because it has a resource still in use, i.e. the queue pair resource. As a result, the ULP kernel extension code has negatively impacted other code outside of itself (a cascading error).

One example of a possible solution to such a ULP error causing memory leakage is bounding the memory leak to only the virtual memory such that it does not affect other elements of the operating system. For example, the RDMA device driver may choose to clean-up the resource represented by the queue pair on the network adapter, but the RDMA device driver cannot free the queue pair memory as it may be referenced by the user space application. In such a situation, the RMDA device driver may still unload, however, the queue pair memory would not be recoverable later. While bounding such memory leakages to only the virtual memory may allow for unloading of the RDMA device driver and somewhat mitigating the memory leak issues, this approach does not address the underlying issue of improper ULP operation with regard to resource reclamation and clean-up as well as First Failure Data Capture (FFDC) principles since, if the source of the memory leak cannot be found when the problem initially occurs, bypassing it at later points during execution is less than effective since memory is still leaked and the ULP is still operating erroneously.

Moreover, the bounding solution is very complex and error prone in itself due to secondary effects outside of the computer programmer's knowledge. The complexity and error prone nature of the bounding solution adds significant risk to the device driver, i.e. adding to the possible error cases the programmer of the device driver will try to cover in the coding of the device driver, when it should be addressed as an application error. The bounding solution results in the ULP executing with invalid logic and potentially with behavior that can inhibit application program interface (API) corrections in the future due to the bulk of code that must be provided to try to protect the device driver from ULPs that operate erroneously Additionally, in the case of network adapter error recovery, the network adapter needs to be reset and the resources reinitialized so that they can be reused, allowing the operating system to continue to function without a reboot, including the functionality of the network adapter that experienced the failure. With RDMA resources, the device driver requires that the ULP free the resources prior to this network adapter recovery and a failure to do so will prevent the network adapter's use by the operating system (and the other ULPs). Identifying the ULP that did not free the resources is difficult without the mechanisms of the illustrative embodiments described hereafter.

In known RDMA architectures, a resource leak will only be detected indirectly, via a system crash or resulting data corruption. Backtracking from the result of the resource leak, i.e. the crash or the data corruption, to identify the resource leak root cause is a non-trivial and time consuming task due to the indirect nature of the error. Therefore, software development and support teams must perform a series of device driver instrumentations and problem recreations in order to pinpoint and identify the source of such crashes and data corruption to thereby identify a resource leak in RDMA resources as the root cause of the problem.

The present illustrative embodiments provide mechanisms to avoid such time consuming and resource cost intensive procedures. Moreover, the present invention operates to assist in the reduction of latent erroneous code in the ULP and provides a mechanism to identify these portions of erroneous code, or "bugs," so that they can be addressed without resorting to these time consuming alternatives.

The core concept implemented by the mechanisms of the illustrative embodiments is to conclusively detect a resource leak condition as soon as it occurs and take appropriate action such that an administrator, application developer, or automated mechanism is notified of the resource leak and can then take corrective actions. The illustrative embodiments make device driver infrastructure sufficiently robust as to reduce software support costs as well as prevent latent application errors from progressing into production environments.

In one illustrative embodiment, these results are achieved by implementing a series of red-black-trees and/or linked-lists to track each resource. In one illustrative embodiment, the resource hierarchy is a variation of the InfiniBand™ parent-child relationship model as implemented in the OFED™ model. The illustrative embodiments leverage protocol and space agnostic (i.e. user space and kernel space agnostic) list and tree services. Furthermore, the illustrative embodiments are usable for both leak detection and proper resource de-allocation order enforcement on a process/application granularity. Moreover, the illustrative embodiments allow for implicit search optimizations on data path through (log 2N) efficiency of ordered balanced binary trees, e.g., red-black-trees.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium is any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As mentioned above, the illustrative embodiments leverage protocol and space agnostic list and tree services in order to provide resource leak detection and reporting functionalities. The illustrative embodiments further modify and extend the context management models in OFED™, where the contexts are data structures storing information for managing resources, and connections with resources, of a data processing system (including, but not limited to, state information for the resource or connections with resources) to provide these linked list and tree data structures upon which the protocol and space agnostic list and tree services may operate. In one illustrative embodiment, the context is the software resource defined by the OFED™ verbs, e.g., identified as an ib_ucontext, and is allocated as a result of a call to alloc_ucontext (and deallocated by dalloc_ucontext) which is a verb used by the application level ULPs that identifies to the OFED™ layer a unified user of resources and user level event handlers. This context resource is tied to all of the subsequent resources the application layers will allocate.

Contexts are required resources for user space applications as the parent for completion queues (CQs) (data structures storing information operations that have been reported as completed) and protection domains (PDs) (data structures representing the access permissions associated with resources). Each context is equivalent to an adapter instance/address space, i.e. each pair of adapter instance and user space address space has its own corresponding user space context data structure. Thus, a user space application may have more than one user space context data structure if that user space application is associated with multiple user space address spaces or there are multiple adapter instances with which the user space application operates.

The illustrative embodiments create and/or instrument a kernel space context data structure to encompass all user space and kernel space resources. However, the kernel space context data structure is not treated as a real kernel resource, i.e. it is not allocated by kernel ULPs.

Thus, with the illustrative embodiments, the OFED™ model architecture is modified to include a kernel space context data structure, when the OFED™ model architecture does not in fact include such a context for the kernel space. The illustrative embodiments further provide a user space context data structure, where each of these kernel space and user space contexts store red-black tree structures for tracking the respective kernel space and user space resources. In addition, the illustrative embodiments provide resource management logic for both kernel space and user space, which is normalized for both kernel space and user space by virtue of the modification to include both kernel space and user space context data structures.

As mentioned above, the kernel space context data structure stores a red-black tree data structure, such as in the form of a linked list, to manage parent-child relationships. A red-black tree is a type of self-balancing binary search tree. The self-balancing is provided by painting each node with one of two colors (these are typically called 'red' and 'black', hence the name of the trees) in such a way that the resulting painted tree satisfies certain properties that do not allow it to become significantly unbalanced, i.e. a significantly higher number of nodes of one color as opposed to the other color. When the tree is modified, the new tree is subsequently rearranged and repainted to restore the coloring properties. The properties are designed in such a way that this rearranging and recoloring can be performed efficiently.

The balancing of the tree is not perfect but it is good enough to allow it to guarantee searching in O(log n) time, where n is the total number of elements in the tree. The insertion and deletion operations, along with the tree rearrangement and recoloring are also performed in O(log n) time. Tracking the color of each node requires only 1 bit of information per node because there are only two colors. The tree does not contain any other data specific to its being a red-black tree so its memory footprint is almost identical to a classic (uncolored) binary search tree. In many cases the additional color bit information can be stored at no additional memory cost. The red black tree has the following properties: (1) every node in the tree is either colored red or black; (2) every leaf node is colored black; (3) if a node is red, then both its children are black (which implies that on any path from a root node to a leaf node, red nodes must not be adjacent, however any number of black nodes may appear in a sequence); and (4) every simple path from a node to a descendant leaf node contains the same number of black nodes.

The resource management logic of the illustrative embodiments, which may reside in a device driver, the kernel, or the like, provides logic for utilizing such red-black trees to enforce node removal rules based on parent-child node relationships as well as identify resource leaks when they occur and provide information about the source of such resource leaks. For example, when the user space application allocates a context (such as by calling ib_ucontext), this context is stored in a list associated with the RDMA control structure (RCS), which is a data structure maintained by the kernel or device driver (hereafter assumed to be the device driver for simplicity of the explanation) and is used to contain RDMA specific data structures. When another, lower level resource is allocated, such as a queue pair (QP), the user space application ties the lower level resource to a context. The device driver tracks this relationship using the list associated with the RCS. The device driver prevents deallocation of the context prior to the deallocation of the lower level resource as it is a child of the context and the existence of the lower level resource assumes the context is available throughout the lifetime of the lower level resource. This enforcement of the ordered deallocation is implemented by the mechanisms of the illustrative embodiments and may also be used to identify potential resource leakages and their sources as described hereafter.

Similarly, with regard to the user space context data structure red-black tree, which in one illustrative embodiment follows the OFED™ model closely as described hereafter, the resource management logic is extended to enforce the rule that a parent node in the tree cannot be removed if a child node exists. This will be illustrated in greater detail hereafter in the discussion of FIGS. 3 and 4. Moreover, resource management logic creates a dependency between completion queues (CQs) and queue pairs (QPs) such that a CQ cannot be removed if an associated QP exits, i.e. the completion queue is a parent to the queue pair. This is achieved by associating the QP with the corresponding CQs at QP creation time in the red-black tree data structure. The red-black tree structure tracks this association between parent CQ and child QPs, with the red-black tree, and associated logic for enforcing deallocation rules, serving as a tracker of such associations. That is, the red-black tree structure serves the dual purpose of allowing the present invention to be aware of unfreed resources as well as allowing the present invention to search for and find specific resources.

Within the user space tree structure(s), each device, e.g., network adapter or the like, is an instance to a hardware specific library, e.g., hardware specific library 140 in FIG. 1, and may contain multiple user space context data structures. Each user space context data structure provides state information that describes a user instance/view and may contain one or more protection domains (PDs) and associated resources. Tracing of resource leak errors is performed from the user space tree data structure to the kernel space error correction logic on a per CQ and per PD control block basis.

There may be a separate user space context data structure provided for each user space application such that there may be multiple separate user space context data structures. In some instances, a single user space application may have multiple user space context data structures. This may occur when a user space application makes use of multiple separate user space address spaces since the user space context data structure essentially represents the pairing of a user space address space with a particular RDMA enabled device, e.g., a RDMA network adapter. This may also occur when an application needs scalability, e.g., the application runs a large number of active connections that function independently and threads are grouped in association with different contexts, or if the application itself is instanced. Essentially, there is no enforced one to one relationship between an application and a context.

In contrast to the user space context data structures, the illustrative embodiments further provide a single kernel space context data structure for a single kernel space address space. This single kernel space context data structure contains a shadow copy of the context information for all of the resources (userspace and kernelspace), thereby providing consistency with the user space context data structures.

The kernel space context data structure comprises a kernel space tree data structure, which again may be a red-black tree data structure implemented using a linked list or other relational structure identifying parent-child relationships. The kernel space tree data structure is a superset of the user space trees with the kernel space tree being extended to store, in association with nodes of the kernel space tree, forensics data that is captured from the various resources. For example, the following forensics data is captured for each resource that is created and may be reported to a system administrator, programmer, or other authorized person when a resource leak is detected, such as may be done through an error log or the like: (1) a process identifier for the process that allocated the resource; (2) the date and/or time when the resource was allocated; and (3) the entire call stack which complements the process identifier in (1) above (this may be provided in an ASCII format, for example). This information may be reported in the error log when a resource leak is detected by walking the tree structures, finding the corresponding node for the resource associated with the detected resource leak, retrieving the collected forensics data associated with the node in the kernel space tree data structure of the kernel space context data structure, and including the forensics data in the error log entry which is then output for use by an authorized person to thereby identify the source of the resource leak.

Figure 4:
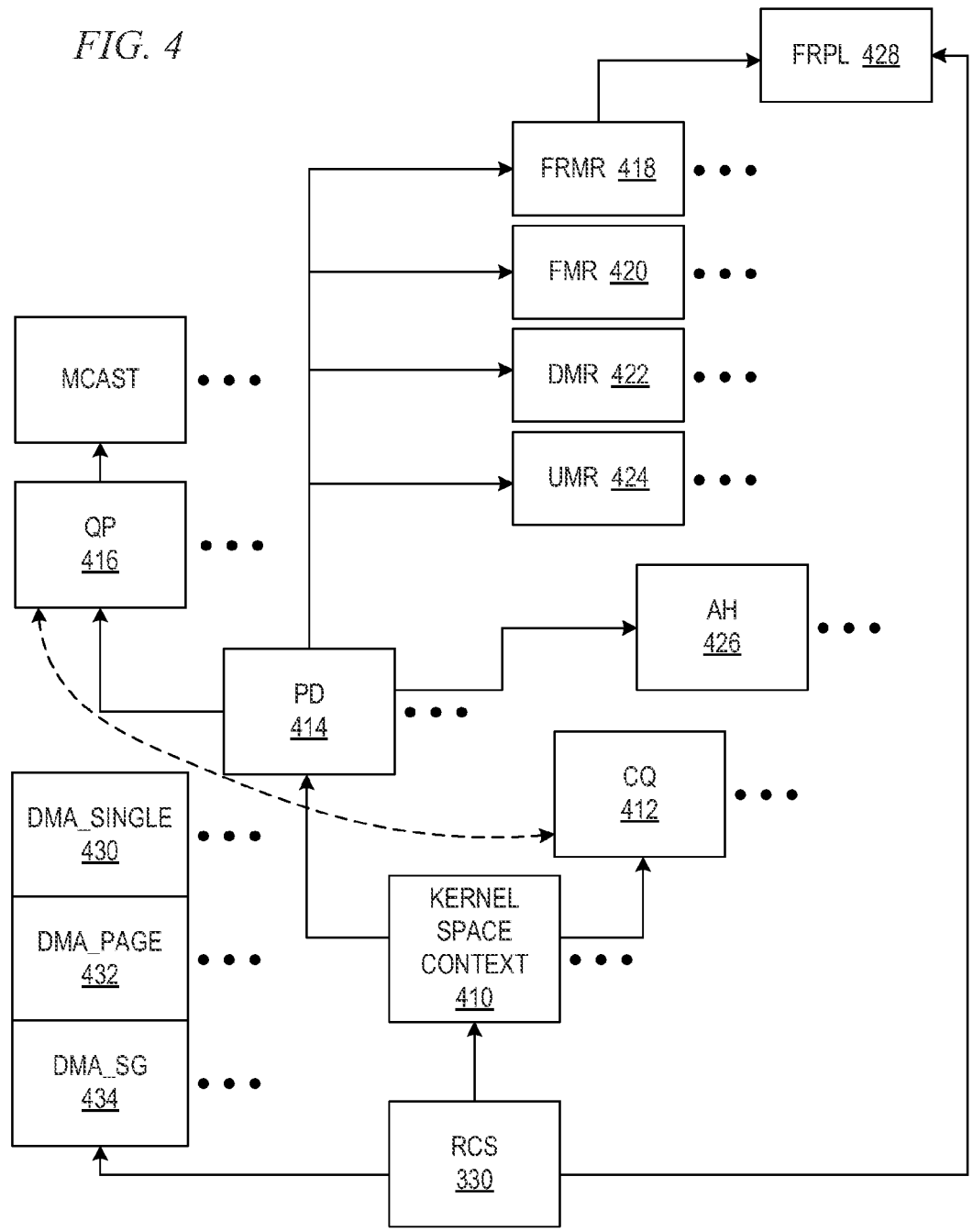
FIG. 4 is an example block diagram of an example kernel space tree data structure in accordance with one illustrative embodiment.

In the kernel space tree data structure, RDMA resources (e.g., dma_single (which maps a single address/length buffer), dma_page (which maps a page of memory), dma_sg (which is a scatter gather resource)) are children of the RDMA control structure (RCS) and peers of the user space context data structures (see FIG. 4, described hereafter). Moreover, as with the user space tree data structures, QPs are children of CQs for data path trace and debugging operations. Moreover, in both the user space tree data structures and the kernel space data structure, the QPs are also children of protection domains (PDs) for control path first failure data collection (FFDC) tracing/debugging operations. Thus, in the user space and kernel space tree structures of the illustrative embodiments, QPs have dual parent relationships, one with the CQs for data path tracing/debugging and one with PDs for control path tracing/debugging. Moreover, in both user space and kernel space tree structures, all resources are children of a corresponding PD. This allows for forward/backward discovery of related resources. In addition, if the resource is a user space resource, then a context data structure for the resource is used as a grandparent in the tree structure so as to fit the architecture model, e.g., the OFED™ model.

It should be noted that in the OFED™ model architecture, there is no formal tracking of RDMA resources for resource leak detection, e.g., memory leak detection. As a result, it is left to the user space application to ensure correct behavior. However, this is error prone for the reasons previously discussed above. The illustrative embodiments provide automated mechanisms at the kernel level using the kernel space context data structure and associated kernel space tree data structure, which may implement a red-black tree mechanism for example, for RDMA resource tracking such that RDMA resource leaks are detected. The red-black tree implementation may be used to allow for DMA address to memory region (MR) decoding on data path operations. The MR refers to a class of memory type resources allocated by the user space application.

The MR resources, e.g. Fast Registration Memory Region (FRMR), DMA Memory Region (DMR), User Memory Region (UMR), Address Handles (AH), etc., are extended to provide tracking type granularity such that these resources need not be tracked as a group but can be tracked separately. Though each type of MR resource is technically an MR, each MR resource's usage may differ and the illustrative embodiments provide the granularity for software serviceability purposes to facilitate the identification of resource usage. Thus, software support can quickly detect which MR type is leaked, improving root cause determination via pruning the problem space. For example, if a device is being closed, the closing of the resource may fail due to a resource still being in use. As the illustrative embodiments track each type of memory region separately, the illustrative embodiments can immediately identify which resource type is still in use, which user space application allocated the resource, and the this information may be used to narrow down which resource is not being freed.

With the illustrative embodiments, the Fast Registration Page List (FRPL) resources are further extended to allow for dual tracking. The FRPL resources map a virtual to bus address page association. This resource is allocated/deallocated independently of the associated FRMR. In the OFED™ model architecture, a post creation tie operation is used to associate the FRPL resource with the FRMR. Thus, it is possible for a verb consumer to allocate the FRPL but not associate the FRPL with the FRMR, thereby leading to a resource leak. That is, since the ULP allocates the resource and later ties it to the FRMR, if its freeing of the resource is tied to the FRMR deallocation logic, a leak of the FRPLs that were not associated with the FRMR is possible. Thus, the tracking of the FRPLs is performed separately from the FRMR (allocated earlier). However, since the FRPLs are tied to the FRMR through the FRMR's lifetime, the FRPL is also tracked in association with the FRMR so that the illustrative embodiments can prevent freeing the FRPL while the FRMR is still active. Thus, the FRPL resources are extended for dual tracking both with regard to the FRPL resources themselves and with regard to the FRMR.

The illustrative embodiments enforce resource leak detection at all scopes by implanting a tracker for the FRPL at the RCS level as well as a tracker in the FRMR whenever an FRPL is associated (see FIG. 4, described hereafter, where dual arrows pointing to FRPL 428 are shown). What is meant by the term "tracker" in this context is the data structure relationship set up in allocation verbs and enforced by the mechanisms of the illustrative embodiments at deallocation. For example, when the FRPL is allocated, the resource is added to the red-black tree of FRPLs as a child of the RCS. When the FRPL is tied to a FRMR, the FRPL is added to the FRMR red-black tree of FRPLs. The FRMR itself is also added into the context's FRMR red-black tree. When the FRPL is freed, the logic of the illustrative embodiments verify that the FRPL is not a part of a FRMR red-black tree, and passing that check, will remove the FRPL from the RCS's tree structure. When the device is closed, one of the checks that is made is that the RCS's FRPL red-black tree is empty. The sum total of the data structure ties and the checking logic together constitute a "tracker."

The FRMR can enforce failures if the verb consumer attempts to deallocate the FRMR prior to the FRPL. That is, each resource deallocation logic of the illustrative embodiments enforces the requirement that the resource not have any child resources still allocated. If a child resource is found by this resource deallocation logic, the deallocation fails and the failure is logged with the resource forensics information associated with the failure providing information as to the source of the failure.

Figure 2:
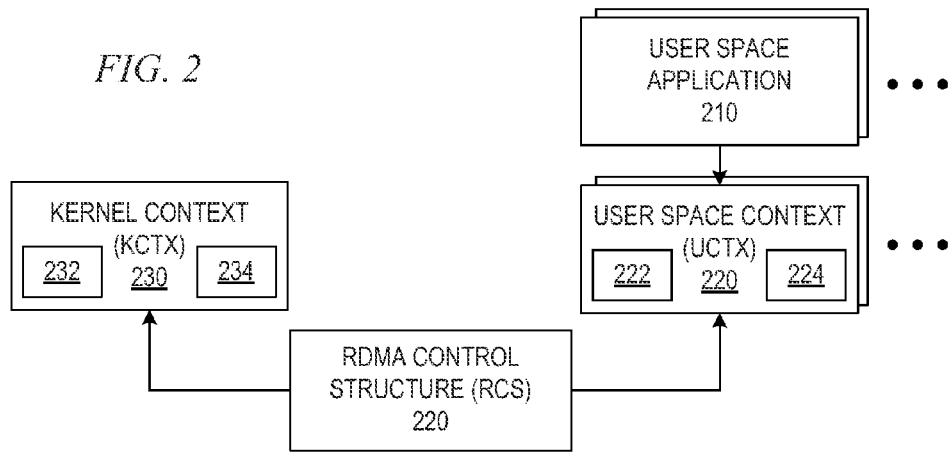
FIG. 2 is an example block diagram illustrating the mechanisms of the illustrative embodiments for context management.

FIG. 2 is an example block diagram illustrating the mechanisms of the illustrative embodiments for context management. As shown in FIG. 2, each user space application 210 has one or more associated user space context data structures 220. Each user space context data structure represents an address space associated with a particular RDMA device, e.g., a RDMA network adapter. Thus, a single user space application may have multiple user space context data structures (uctx) 220. Each uctx 220 comprises state information 222 for the user space application as well as a user space tree data structure 224 representing the user space view of the resources associated with the user space address space corresponding to the user space application. The user space tree data structure 224 follows the parent-child relationship rules previously mentioned above such that context data structures, protection domains (PDs), completion queues (CQs), queue pairs (QPs), and the like, are represented with appropriate parent-child relationships to enforce creation/removal requirements for resource leakage detection and reporting.

As further shown in FIG. 2, the illustrative embodiments introduce a single kernel space context data structure (kctx) 230 which represents a single kernel space address space and all of the user space resources across all of the user space applications. The kctx 230 comprises state information 232 for the various kernel space resources as well as a kernel space tree data structure 234 representing the kernel space view of the resources associated with the various user space applications. In addition, nodes of the kernel space tree data structure 234 representing resources of the data processing system have associated forensics data stored in them, or in association with them, for later use in resource leak detection and reporting, such as via error logs or the like. This information is captured when the resources, e.g., CQs, QPs, devices added to PDs, etc., are created.

The tree data structures in the uctx 220 and kctx 230 may be implemented as red-black trees in one illustrative embodiment so as to track resource leaks. It should be appreciated, however, that while the red-black trees implementation is described herein as an example implementation, the illustrative embodiments are not limited to such. Rather, any linked list, tree structure, or other data structure capable of representing hierarchical relationships between entities, such as resources, contexts, and the like, may be used without departing from the spirit and scope of the illustrative embodiments.

As further shown in FIG. 2, the user space context data structures 220 and the kernel space context data structure 230 are managed by a RDMA control structure (RCS) 240. The RCS 240 is a root data structure for the hardware specific layer that contains the RDMA related data structures for a specific hardware device, e.g., network adapter. There is an RCS 240 for each network adapter associated with the host system and each RCS 240 contains all RDMA related data structures as children (or children of children, etc.). The RCS 240 may be mirrored in the hardware specific library to allow checking the RCS 240 without entering the kernel.

The logic, which may be part of the OFED™ core 160, hardware specific device driver 195, or the like in FIG. 1, may implement the resource management logic of the illustrative embodiments for tracking, detecting, and reporting resource leakages using the context data structures 220 and 230. That is, the logic of the illustrative embodiments implemented, for example, in hardware specific device driver 195 may use the tree structures 224 and 234 of these context data structures 220 and 230 to enforce rules regarding resource removal so as to detect and/or avoid resource leak conditions and in response to detecting a resource leak, obtaining corresponding forensics data from the tree structures to identify the source of the resource leak in a notification message, error log, or the like. A description of the processes involved in performing the resource leak detection and notification will be provided hereafter with reference to the flowcharts of FIGS. 5 and 6.

Figure 3:
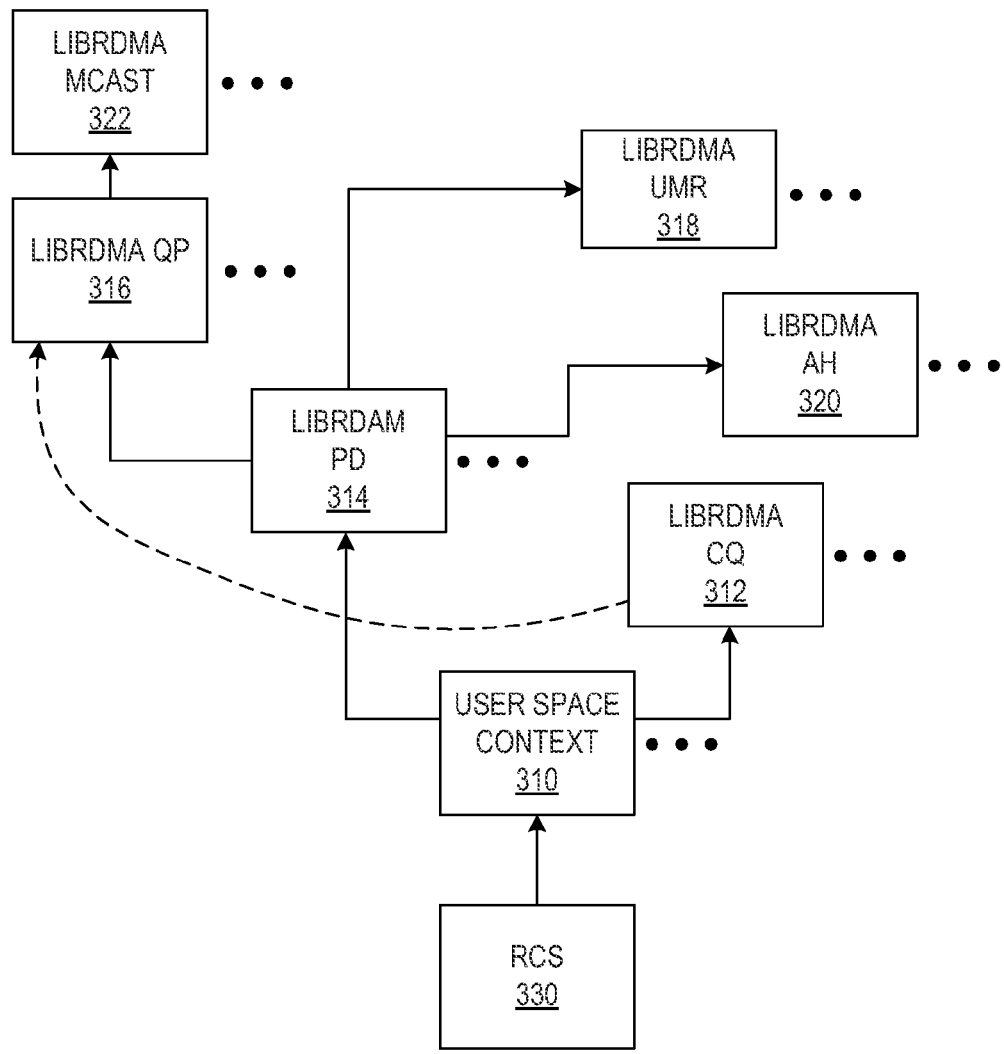
FIG. 3 is an example block diagram of an example user space tree data structure in accordance with one illustrative embodiment.

FIG. 3 is an example block diagram of an example user space tree data structure in accordance with one illustrative embodiment. As shown in FIG. 3, the user space tree data structure 300 is essentially a "tree of trees" that defines the inter resource associations. The user space tree data structure 300 is a "tree of trees" in that at each level of the tree, sub-trees may be defined, e.g., a first tree comprising elements 314, 316, 318, 320, and 322 and a higher level second tree comprising all elements of FIG. 3. With the user space tree data structure, various rules are enforced to generate the associations between resources and thereby make it possible to enforce rules regarding removal of nodes from tree structures that enable resource leak detection. For example, in the user space tree data structure 300, devices are represented as instances to a library such that a device, e.g., RDMA network adapter, is represented as a library instance, e.g., each node of type "librdma" shown in FIG. 3. In FIG. 3, the device is represented as one or more user space contexts 310 with associated completion queues (CQs) 312, protection domains (PDs) 314, QPs 316, and other resources 318-320. Each such device may be associated or contain multiple user space contexts 310. The user space contexts 310 are managed by the RCS 330, which may be RCS 240 in FIG. 2, for example.

As shown in FIG. 3, rules for building the user space tree data structure include the rule that the QPs 316 are children of associated CQs 312 for data path tracing/debugging purposes. In addition QPs 316 are children of associated PDs 314 for control path first failure data collection (FFDC) tracing/debugging purposes. Thus, the QPs 316 have dual parental relationships with the QPs 316 and PDs 314. All resources nodes, e.g., QPs 316 and other resources 318-320, are children of the associated PD 314. With this structure in place, the rule that a parent node cannot be removed if a child node exists may be enforced by the resource management logic to thereby detect and report resource leakages in the data processing system. Thus, if a process attempts to remove a resource, such as a CQ 312 from the data processing system without freeing the child nodes associated with the QP 316, then the process may return an error indicating a potential source of a resource leak, e.g., the CQ 312 being freed without its associated QP 36 being freed resulting in the QP 316 representing the resource leak.

In addition, in the event of a detected resource leak, the tree structure 300 may be searched, such as using a red-black tree searching algorithm, to find the nodes in the tree structure 300 that correspond to the detected resource leak and this may further be used with the kernel space tree data structure to retrieve forensics data to be used in reporting the resource leak. That is, if a node is identified in the tree structure 300 that corresponds to a resource leak, the same node may be found in the kernel space tree data structure and the corresponding forensics data may be retrieved and inserted into an error log data structure entry. Thus, for example, if a device is being deallocated, if the protection domain (PD) resource is still allocated, the deallocation logic of the present invention may identify this PD resource being still allocated and thus, representing a resource leak. Corresponding forensics data for the PD resource may be retrieved from the kernel space tree data structure, such as indicating that the device driver could not be unloaded due to a resource leak of the PD by the particular code path that allocated the PD at a particular time. Thus, the detection of the resource leak not only identifies the resource leak itself, but provides additional forensics information identifying the source of the resource leak.

FIG. 4 is an example block diagram of an example kernel space tree data structure in accordance with one illustrative embodiment. The kernel space tree data structure 400 follows the same rules for parent-child dependencies as with the user space tree data structure so as to make the kernel space tree data structure 400 consistent with the user space tree data structure 300. Moreover, with the kernel space tree data structure 400, the OFED™ core 160 in FIG. 1 is treated as if it were a separate resource. Thus, the OFED™ core 160 is represented in the kernel space tree data structure 400 as a plurality of resources including QPs, PDs, CQs, and other resources. Thus, as shown in FIG. 4, the OFED™ core is represented by an OFED™ core context 410, or kernel context 410, which has completion queues (CQs) 412, protection domains (PDs) 414, QPs 416, and other resources 418-434. In addition, each user space resource may also be represented within the kernel space tree data structure 400 as shadow copies of the user space tree data structures from the various user space contexts (not shown). As with the user space contexts 310 in FIG. 3, the kernel space context data structure 410 is managed by the RCS 330, which may be RCS 240 in FIG. 2, for example. Thus, the RCS 330 is a parent of both the user space context 310 and the kernel space context 410.

As shown in FIG. 4, as with the user space tree data structure 300, rules for building the user space tree data structure include the rule that the QPs 416 are children of associated CQs 412 for data path tracing/debugging purposes. In addition QPs 416 are children of associated PDs 414 for control path first failure data collection (FFDC) tracing/debugging purposes. Thus, the QPs 416 have dual parental relationships with the QPs 416 and PDs 414. All resources nodes, e.g., QPs 416 and other resources 418-428, are children of the associated PD 414. The RDMA resource nodes 430-434 are children of the RCS 330 and peers to the context nodes 410.

In addition, it should be noted that each resource node, when it is created, has corresponding forensic data collected about the resource and stored in association with the resource node in the kernel space tree data structure. This forensic data includes the process identifier of the process that allocated the resource, the date and/or time of that the resource was allocated, and the entire call stack complementing the process identifier. Thus, when a resource leak is detected in association with a particular resource, this information may be retrieved from the corresponding node in the kernel space tree data structure to thereby identify the source of the resource leak. This information may be included in a notification message sent to an authorized user, stored in an error log, or otherwise communicated to authorized personnel for error tracking and resolution.

With this structure in place, as with the user space tree data structure, the rule that a parent node cannot be removed if a child node exists may be enforced by the resource management logic to thereby detect and report resource leakages in the data processing system.

Figure 5:
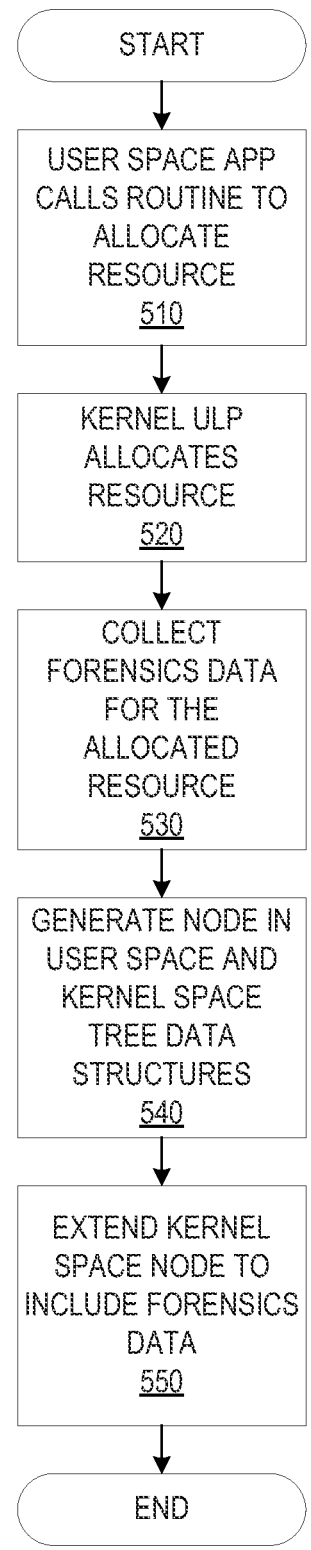
FIG. 5 is a flowchart outlining an example operation for allocating a resource in accordance with one illustrative embodiment.

FIG. 5 is a flowchart outlining an example operation for allocating a resource in accordance with one illustrative embodiment. As shown in FIG. 5, the operation starts with a userspace application calling a routine to allocate a resource, e.g., a QP, PD, or the like (step 510). A kernel Upper Layer Protocol (ULP) allocates the resource (step 520) and forensics data for the allocation of the resource is collected (step 530). A corresponding node in the user space and kernel space tree data structures is generated in accordance with the hierarchy rules described above (step 540). Thus, depending upon the type of resource being allocated, different child-parent associations are made in the tree data structures based on the specified hierarchical rules, e.g., QPs are children of both the CQ and the PD, FRPLs are children of both the RCS and the FRMR, etc. In the kernel space tree data structure, the node for the allocated resource is extended to store the collected forensics data (step 550). The operation then terminates for this resource allocation but may be repeated for each subsequent resource allocation.

Figure 6:
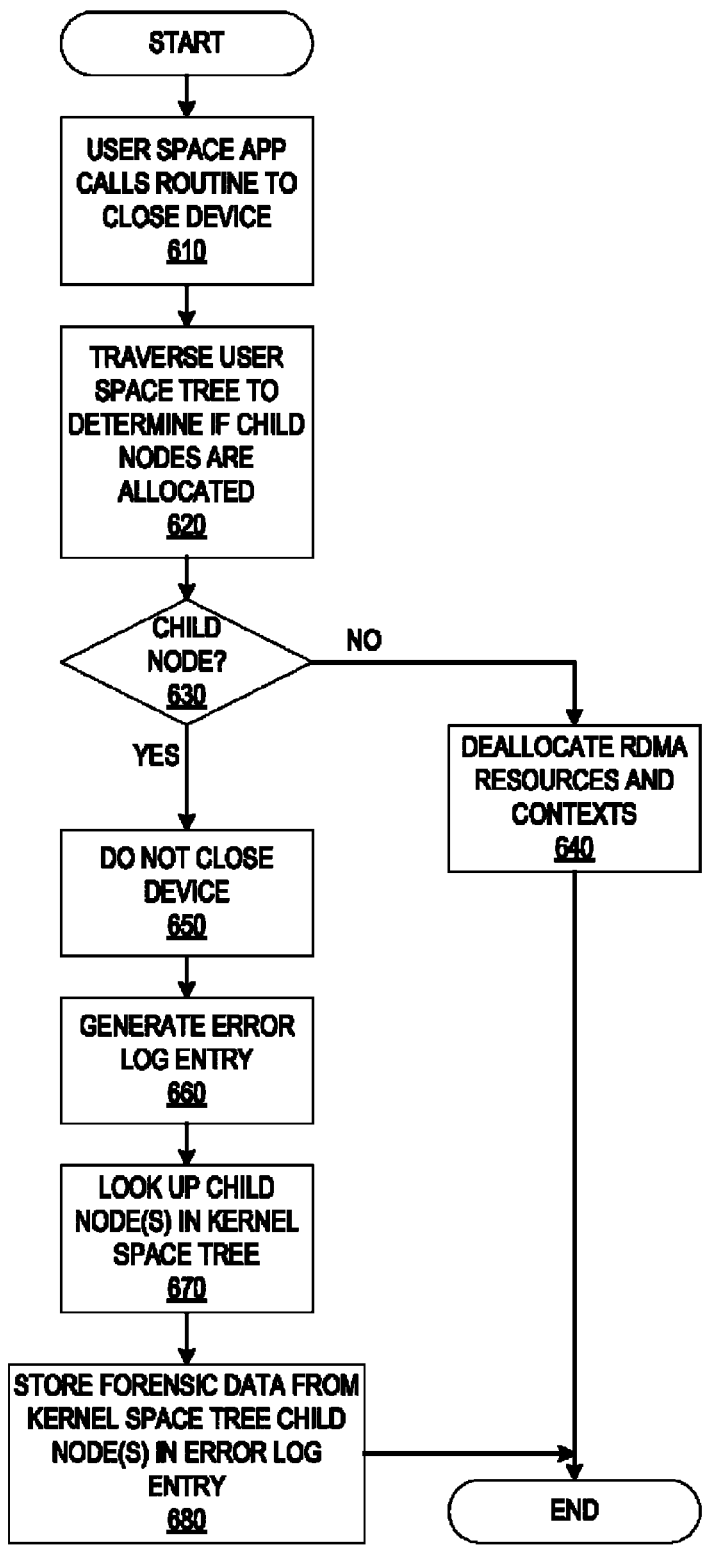
FIG. 6 is a flowchart outlining an example operation for performing resource leak detection and reporting in accordance with one illustrative embodiment.

FIG. 6 is a flowchart outlining an example operation for performing resource leak detection and reporting in accordance with one illustrative embodiment. As shown in FIG. 6, the operation starts by having a user space application call a routine to close a device (step 610). The user space tree data structure is traversed to determine if the context associated with the device has any child nodes that are still allocated (step 620). A determination is made as to whether the context has any child nodes that are still allocated (step 630). If not, any remaining RDMA resources and the device's associated user space and kernel space contexts may be deallocated (step 640).

If there are child nodes, then these represent a resource leak. As a result, the device is not permitted to close (step 650) and an error log entry may be generated indicating the inability to perform the close operation and the reason, i.e. a resource leak (step 660). In addition, a lookup of the child node(s) in a kernel space tree data structure is performed to find corresponding node(s) in the kernel space tree data structure and retrieve the forensic data stored in, or in association with, these node(s) (step 670). The forensic data is stored in the error log entry for later use, such as output to a system administrator or other authorized user via a client computing device, processing by an automated mechanism for performing error correction or reporting, or the like (step 680). The operation then terminates.

To further illustrate the operation of the mechanisms of the illustrative embodiments, with reference again to FIG. 4, the following series of events may occur in order on a system implementing the mechanisms of the illustrative embodiments. Of course other events, unrelated to the described flow, may or may not occur between any of these listed events:

a. Kernel ULP allocates a CQ.
  i. The hardware specific library or hardware specific driver (depending upon the particular implementation; hereafter referred to as the "HW") records information about the allocating function including the time stamp and stack path that allocated the resource (in 412).
  ii. The CQ is associated with the children of the kernel level Context (410).
b. Kernel ULP allocates a PD.
  i. The HW records information about the allocating function for the PD (414) structure (as it did for the CQ).
  ii. The PD is associated with the children of the kernel level Context (410).
c. Kernel ULP allocates a QP.
  i. The HW records information about the allocating function for the QP (416) structure (as it did for the CQ).
  ii. The QP is associated with the children of the user identified PD (414) as well as the children of the CQ's (412) data structure.
d. A user attempts to unload the device driver.
  i. At this point, the hw layer will break the connection, notifying the owners of all resources that they need to release the resources allocated.
  ii. The HW waits for the resources to be freed before unloading the device driver. The HW waits for the Kernel Context's tracked resources to be freed.
e. The user wants to discover why the unloading of the device driver is delayed, and issues a command to dump information about outstanding resources. On calling the command, the user is able to identify the CQ and QP still being allocated, when they were allocated, and the individual stack traces that identify who allocated them allowing the issue to be debugged.

In another example, with reference to FIG. 3 data structures, the following series of events may occur in the described order. Other events, unrelated to the described flow may or may not occur between any of these events.

a. Application ULP allocates a Context (310)
  i. The HW records information about the allocating function including the time stamp and stack path that allocated the user level Context resource (in 310).
  ii. The Context is associated with the children of the RCS (330)
b. Application ULP allocates a CQ.
  i. The HW records information about the allocating function for the CQ (312) structure (as it did for the Context).
  ii. The CQ is associated with the children of the user identified user level Context (310).
c. Application ULP allocates a PD.
  i. The HW records information about the allocating function for the PD (314) structure (as it did for the Context).

ii. The PD is associated with the children of the user identified user level Context (310).

d. Application ULP allocates a QP.

i. The HW records information about the allocating function for the QP (316) structure (as it did for the Context).

ii. The QP is associated with the children of the user identified PD (314) and the children of the user identified CQ (312).

e. Time passes and the user attempts to deallocate the CQ i. The HW will fail the command as the CQ has existing children (check against the registered QP).

1. It can log the event with the relevant debug information identifying the CQ allocated, QP allocated and the path attempting to deallocate the CQ. This will allow quick resolution to the erroneous application.

Thus, the illustrative embodiments provide mechanisms for strict deterministic enforcement of resource leak detection for RDMA resources. The illustrative embodiments detect and report resource leakages upon the first occurrence, i.e. FFDC, with sufficient forensics information to indicate the process/application responsible for the resource leak. The illustrative embodiments further improve the software support process by virtue of pruning the error space in root cause determination. That is, by tying the report of a resource leak to a specific resource type, the illustrative embodiments have effectively pruned the problem beyond the ULP involved, but also to a specific resource that the ULP is using. This allows the ULP to narrow the search for the source of the resource leak, beyond just a check of all RDMA resources uses or even all memory regions, to a specific type of RMDA resource or memory region.

In view of the above, it can be seen that the illustrative embodiments may be utilized and implemented in many different types of data processing environments where RDMA resource leak detection mechanisms are not provided. For example, the illustrative embodiments may be used and implemented in many different types of computing environments that implement a fabric switched network, such as InfiniBand™, OFED™, or the like. Moreover, in general, the illustrative embodiments are implemented in resource management logic provided at the kernel level of the software executing on a data processing system. The illustrative embodiments operate to identify and report resource leakages at the kernel level by using the link list and tree data structures previously described along with additional resource management logic introduced by the present invention that operates on such linked lists and tree data structures within the user space context data structure(s) and kernel space data structure.

Figure 7:
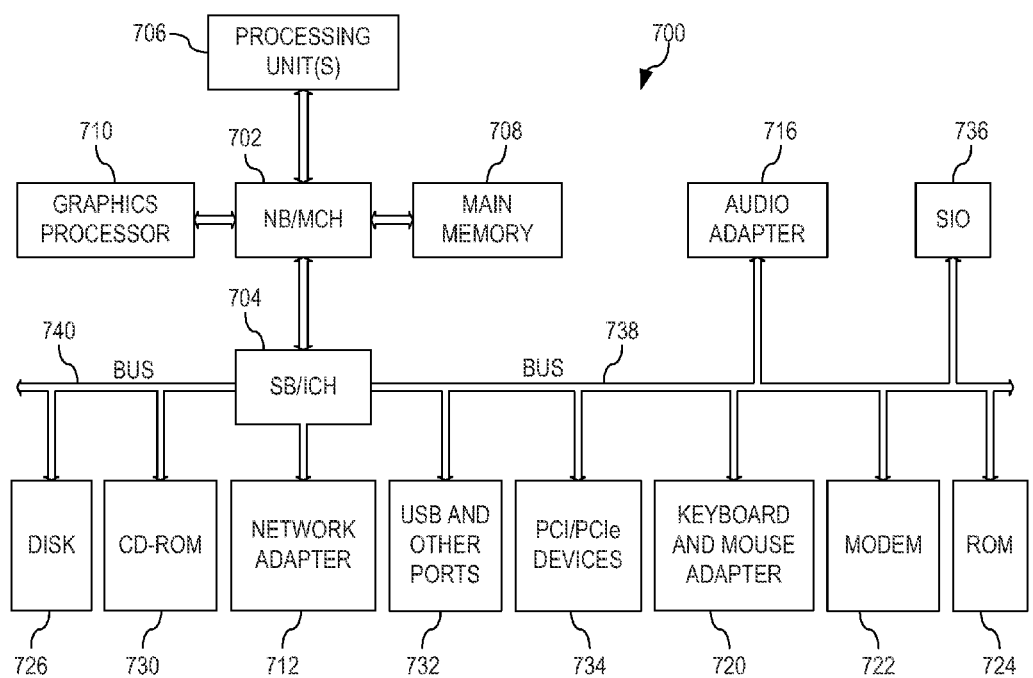
FIG. 7 is an example block diagram of a computing device in which aspects of the illustrative embodiments may be implemented.

FIG. 7 is provided hereafter as example data processing system environment, or computing device, in which aspects of the illustrative embodiments may be implemented. It should be appreciated that FIG. 7 is only an example and is not intended to assert or imply any limitation with regard to the environments in which aspects or embodiments of the present invention may be implemented. Many modifications to the depicted environment may be made without departing from the spirit and scope of the present invention.

FIG. 7 is a block diagram of an example data processing system, or computing device, in which aspects of the illustrative embodiments may be implemented. Data processing system 700 is an example of a computing device, which may be implemented as a client computing device, server computing device, stand-alone computing device, or the like, in which computer usable code or instructions implementing the processes for illustrative embodiments of the present invention may be located.

In the depicted example, data processing system 700 employs a hub architecture including north bridge and memory controller hub (NB/MCH) 702 and south bridge and input/output (I/O) controller hub (SB/ICH) 704. Processing unit 706, main memory 708, and graphics processor 710 are connected to NB/MCH 702. Graphics processor 710 may be connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 may be connected to SB/ICH 704.

An operating system runs on processing unit 706. The operating system coordinates and provides control of various components within the data processing system 700 in FIG. 7. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 700.

As a server, data processing system 700 may be, for example, an IBM® eServer™ System p® computer system, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and may be loaded into main memory 708 for execution by processing unit 706. The processes for illustrative embodiments of the present invention may be performed by processing unit 706 using computer usable program code, which may be located in a memory such as, for example, main memory 708, ROM 724, or in one or more peripheral devices 726 and 730, for example.

A bus system, such as bus 738 or bus 740 as shown in FIG. 7, may be comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, may include one or more devices used to transmit and receive data. A memory may be, for example, main memory 708, ROM 724, or a cache such as found in NB/MCH 702 in FIG. 7.

Those of ordinary skill in the art will appreciate that the hardware in FIG. 7 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a data processing system, causes the data processing system to:
    generate, in a user space of the data processing system, a user space context comprising a user space RDMA resource hierarchical data structure;
    generate, in a kernel space of the data processing system, a kernel context comprising a kernel RDMA resource hierarchical data structure, wherein the kernel RDMA resource hierarchical data structure comprises nodes of the user space RDMA resource hierarchical data structure;
    receive a request to close a RDMA resource;
    traverse the user space RDMA resource hierarchical data structure to determine whether the RDMA resource has child RDMA resources allocated in the user space RDMA resource hierarchical data structure;
    detect a resource leak in response to determining, based on at least one of the user space RDMA resource hierarchical data structure or the kernel RDMA resource hierarchical data structure, that the RDMA resource has a child RDMA resource allocated in the user space RDMA resource hierarchical data structure; and
    report the resource leak.

2. The computer program product of claim 1, wherein at least one of the user space RDMA resource hierarchical data structure or the kernel RDMA resource hierarchical data structure comprises a red-black tree data structure.

3. The computer program product of claim 1, wherein the computer readable program further causes the data processing system to:
    enforce an ordered deallocation policy specifying that parent resources in the user space RDMA resource hierarchical data structure or kernel RDMA resource hierarchical data structure cannot be deallocated prior to child resources of the parent resources being deallocated, wherein detecting a resource leak comprises detecting an attempt to violate the ordered deallocation policy.

4. The computer program product of claim 1, wherein the kernel RDMA resource hierarchical data structure is a superset of the user space RDMA resource hierarchical data structure and comprises data representing RDMA resources represented in the user space RDMA resource hierarchical data structure and kernel space RDMA resources.

5. The computer program product of claim 4, wherein nodes of the kernel RDMA resource hierarchical data structure corresponding to user space RDMA resources or kernel space RDMA resources further comprise associated forensic data collected from the user space RDMA resources or kernel space RDMA resources, wherein the forensic data associated with a node of the kernel RDMA resource hierarchical data structure provides information identifying a source of a resource leak associated with the node.

6. The computer program product of claim 5, wherein the forensic data comprises at least one of a process identifier for a process that allocated a RDMA resource associated with the node, an indicator of when the RDMA resource associated with the node was allocated, or an entire call stack of a process that allocated the RDMA resource associated with the node.

7. The computer program product of claim 5, wherein the computer readable program further causes the data processing system to report the resource leak at least by:
    correlating the child RMDA resource with a corresponding node in the kernel RDMA resource hierarchical data structure;
    retrieving from the node corresponding to the child RDMA resource, forensic data; and
    generating a resource leak notification comprising the forensic data.

8. The computer program product of claim 1, wherein the user space RDMA hierarchical data structure and kernel RDMA hierarchical data structure are generated using logic that enforces a rule that a queue pair (QP) RDMA resource is a child of a corresponding completion queue (CQ) RDMA resource and a corresponding protection domain (PD) RDMA resource.

9. The computer program product of claim 1, wherein the user space RDMA hierarchical data structure and kernel RDMA hierarchical data structure are generated using logic that enforces a rule that a Fast Registration Page List (FRPL) RDMA resource is a child of a corresponding Fast Registration Memory Region (FRMR) RDMA resource and a RDMA control structure (RCS).

10. An apparatus comprising:
    a processor; and
    a memory coupled to the processor, wherein the memory comprises instructions which, when executed by the processor, cause the processor to:
    generate, in a user space of the data processing system, a user space context comprising a user space RDMA resource hierarchical data structure;
    generate, in a kernel space of the data processing system, a kernel context comprising a kernel RDMA resource hierarchical data structure, wherein the kernel RDMA resource hierarchical data structure comprises nodes of the user space RDMA resource hierarchical data structure;

receive a request to close a RDMA resource;

traverse the user space RDMA resource hierarchical data structure to determine whether the RDMA resource has child RDMA resources allocated in the user space RDMA resource hierarchical data structure;

detect a resource leak in response to determining, based on at least one of the user space RDMA resource hierarchical data structure or the kernel RDMA resource hierarchical data structure, that the RDMA resource has a child RDMA resource allocated in the user space RDMA resource hierarchical data structure; and report the resource leak.

* * * * *